United States Patent
Zhang

(10) Patent No.: US 12,372,373 B2
(45) Date of Patent: Jul. 29, 2025

(54) SYSTEM AND METHOD FOR GENERATING STORAGE LANE MARKINGS FOR A MAP

(71) Applicant: HERE Global B.V., Eindhoven (NL)

(72) Inventor: Zhenhua Zhang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 339 days.

(21) Appl. No.: 17/699,984

(22) Filed: Mar. 21, 2022

(65) Prior Publication Data
US 2023/0296403 A1    Sep. 21, 2023

(51) Int. Cl.
G01C 21/00    (2006.01)
G08G 1/056    (2006.01)

(52) U.S. Cl.
CPC .......... *G01C 21/3819* (2020.08); *G08G 1/056* (2013.01)

(58) Field of Classification Search
CPC .............................. G08G 1/056; G01C 21/3819
See application file for complete search history.

(56) References Cited

U.S. PATENT DOCUMENTS

| | | | |
|---|---|---|---|
| 9,963,147 B2 | 5/2018 | Kobayashi | |
| 10,521,676 B2 | 12/2019 | Lee | |
| 2016/0101729 A1* | 4/2016 | Burke | B60W 50/14 701/36 |
| 2019/0375429 A1* | 12/2019 | Gardner | B60W 30/08 |
| 2020/0041284 A1 | 2/2020 | Liu et al. | |
| 2021/0012661 A1* | 1/2021 | Yang | G08G 1/167 |
| 2021/0020045 A1* | 1/2021 | Huang | G01C 21/3804 |

FOREIGN PATENT DOCUMENTS

CN    105206077 A    12/2015
WO    2019223965 A1    11/2019

OTHER PUBLICATIONS

Ren et al., "A novel left-turn signal control method for improving intersection capacity in a connected vehicle environment", Article, Published: Sep. 19, 2019, retrieved from https://www.researchgate.net/publication/335940895_A_Novel_Left-Turn_Signal_Control_Method_for_Improving_Intersection_Capacity_in_a_Connected_Vehicle_Environment/link/5d84d20ba6fdcc8fd6feff84/download, 20 pages.

* cited by examiner

*Primary Examiner* — Andrea C Leggett

(57) ABSTRACT

A system is disclosed for generating a storage lane marking for a map database. The system, for example, generates a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology. The system further makes a determination of whether the candidate storage lane marking is valid based on one or more of following: (i) whether one or more vehicle path locations are located within a polygon defined by (a) the candidate storage lane marking and (b) a corresponding edge of the first topology, or (ii) whether the candidate storage lane marking is located within another topology different from the first topology.

14 Claims, 11 Drawing Sheets

SYSTEM AND METHOD FOR GENERATING STORAGE LANE MARKINGS FOR A MAP

TECHNOLOGICAL FIELD

The present disclosure generally relates to storage lane markings in map databases, and more particularly relates to method and system for generating storage lane markings in map databases.

BACKGROUND

Storage lane is a portion of an auxiliary lane required to store the maximum number of vehicles likely to accumulate in the lane during peak traffic time period. Generally, a storage lane splits from or merges into a through-traffic lane. It is used to store the left/right-turn vehicles when they are waiting for the left/right protected signals so that those vehicles do not block the vehicles in through-traffic lane. It is important that the storage lanes are marked with a high precision in a map database in order ensure congestion-free traffic on roads around storage lanes. However, lane markings for storage lanes are usually overlooked in sensor-based autonomous application due to many reasons. One reason why they are overlooked is that the storage lane markings are usually short in length and located on the leftmost or rightmost of the road. As such, the storage lane markings can be easily missed through traffic. Another reason is that the storage lane markings can be more easily detected by the vehicles running on that lane than those running on nearby lanes. Therefore, due to the lack of left/right-turn vehicles, storage lanes are overlooked. Yet another reason is that the storage lane markings are not included in the lane count information in digital maps. As such, normal completion based on one or two reliable lane markings and historical lane count will not find the correct side of the storage lane marking and complement the storage lane markings.

Therefore, there is a need to accurately and efficiently generate storage lane markings, for provision of accurate navigation services.

BRIEF SUMMARY OF SOME EXAMPLE EMBODIMENTS

In case of modern day navigation services which are based on high definition maps and real-time data for depicting map data with greater clarity and detail on superior in-vehicle user interfaces, it becomes even more critical to depict information of navigation related entities and their attributes with accuracy, clarity and precision. Further, with reliance of data collection technologies for map data (like for high definition maps) on a plurality of data sources such as sensors, satellite imagery, ground truth vehicles and the like, likelihood of errors due to different types of data sources and presence of false positives and false negatives in collected data need to be tackled with precision. For example, in the case of map data related to lane markings, there may be reliance on data sources with image recognition capabilities for detecting lane markings. These data sources may include vehicle sensors or cameras and satellite images detecting lanes markings. The lane marking may include storage lane marking for indicating the storage lane which is a portion of an auxiliary lane required to store vehicles likely to accumulate in the lane, for example, to make a right or left turn. However, sometimes, lane markings for the storage lanes are overlooked in sensor-based autonomous application, for various reasons some of which are already discussed above.

In order to solve the foregoing problem, the present disclosure provides systems and methods that help to generate candidate storage lane marking and then validate these candidate storage lane markings to output the validated storage lane markings.

The methods and systems provide techniques for generating a candidate storage lane marking for a first topology based on the candidate storage lane marking being (i) to the left of a leftmost through-traffic lane marking of the first topology or to the right of a rightmost through-traffic lane marking of the first topology, and (ii) on either start or end of the first topology. Further, the methods and systems provide techniques for validating the candidate storage lane marking based on (i) whether one or more vehicle path locations are located within a polygon defined by (a) the candidate storage lane marking and (b) a corresponding edge of the first topology, or (ii) whether the candidate storage lane marking is located within another topology different from the first topology. If the determination is invalid, then, the candidate storage lane marking is discarded or disregarded, and if the determination is valid, then, the candidate storage lane marking is outputted.

By way of the above techniques, the methods and systems provide for accurately and efficiently generating storage lane markings on the maps that may otherwise go missing, in spite of being detected by the vehicle sensors. The above techniques further provide for estimating a geometry of a storage lane based on a trajectory formed by the one or more vehicle path locations and a subset of the lane marking data associated with the first topology, wherein the subset of the lane marking data comprises lane marking detections within a first threshold distance of the trajectory.

In one aspect, a system for generating a storage lane marking is disclosed. The system comprises a memory configured to store computer-executable instructions and at least one processor configured to execute the computer-executable instructions to generate a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology. The at least one processor is further configured to make a determination of whether the candidate storage lane marking is valid based on one or more of following: (i) whether one or more vehicle path locations are located within a polygon defined by (a) the candidate storage lane marking and (b) a corresponding edge of the first topology, or (ii) whether the candidate storage lane marking is located within another topology different from the first topology. Further, if the determination is that the candidate storage lane marking is invalid, then, responsive to the determination, the at least one processor is further configured to discard or disregard the candidate storage lane marking. Furthermore, if the determination is that the candidate storage lane marking is valid, then, responsive to the determination, the at least one processor is further configured to output the candidate storage lane marking.

In additional system embodiments, making the determination further includes determining that the candidate storage lane marking is valid if one or more vehicle path locations are located within the polygon. Further, making the determination includes determining that the candidate storage lane marking is valid if the candidate storage lane marking is not located within another topology.

In additional system embodiments, generating the candidate storage lane marking is further based on a lane width associated with the first topology. Further, the corresponding edge of the first topology is (i) the leftmost through-traffic lane marking if the candidate storage lane marking is generated to the left of the leftmost through-traffic lane marking or (ii) the rightmost through-traffic lane marking if the candidate storage lane marking is generated to the right of the rightmost through-traffic lane marking.

In additional system embodiments, the candidate storage lane marking is associated with a storage lane, such that the storage lane stores at least one of a left turning traffic or a right turning traffic associated with the first topology, when the at least one of the left turning traffic or the right turning traffic is in a waiting state. Further, the at least one processor is configured to estimate a geometry of a storage lane based on a trajectory formed by the one or more vehicle path locations and a subset of the lane marking data associated with the first topology, such that the subset of the lane marking data comprises lane marking detections within a first threshold distance of the trajectory.

In additional system embodiments, the left most through-traffic lane marking is associated with a left most lane of the first topology on which straight running traffic navigates, and the right most through-traffic lane marking is associated with a right most lane of the first topology on which the straight running traffic navigates.

In additional system embodiments, the at least one processor is further configured to validate the candidate storage lane marking based on additional lane marking data associated with one or more nearby topologies that are within a second threshold distance from the first topology. The processor is further configured to update the map data with storage lane related data based on the validation. The candidate storage lane marking is invalid when the additional lane marking includes the candidate storage lane marking within a third threshold distance associated with the nearby topology. Further, the at least one processor is further configured to validate the candidate storage lane marking based on a lane width data associated with the first topology.

In another aspect, a method for generating a storage lane marking is provided. The method includes generating a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology. The method further includes making a determination of whether the candidate storage lane marking is valid based on one or more of following: (i) whether one or more vehicle path locations are located within a polygon defined by (a) the candidate storage lane marking and (b) a corresponding edge of the first topology, or (ii) whether the candidate storage lane marking is located within another topology different from the first topology. Further, if the determination is that the candidate storage lane marking is invalid, then, responsive to the determination, the method further includes discarding or disregarding the candidate storage lane marking. Furthermore, if the determination is that the candidate storage lane marking is valid, then, responsive to the determination, the method further includes outputting the candidate storage lane marking.

In additional system embodiments, making the determination further include determining that the candidate storage lane marking is valid if one or more vehicle path locations are located within the polygon. Further, making the determination includes determining that the candidate storage lane marking is valid if the candidate storage lane marking is not located within another topology.

In additional system embodiments, generating the candidate storage lane marking is further based on a lane width associated with the first topology. Further, the corresponding edge of the first topology is (i) the leftmost through-traffic lane marking if the candidate storage lane marking is generated to the left of the leftmost through-traffic lane marking or (ii) the rightmost through-traffic lane marking if the candidate storage lane marking is generated to the right of the rightmost through-traffic lane marking.

In additional system embodiments, the candidate storage lane marking is associated with a storage lane, such that the storage lane stores at least one of a left turning traffic or a right turning traffic associated with the first topology, when the at least one of the left turning traffic or the right turning traffic is in a waiting state. The method further includes estimating a geometry of a storage lane based on a trajectory formed by the one or more vehicle path locations and a subset of the lane marking data associated with the first topology, such that the subset of the lane marking data comprises lane marking detections within a first threshold distance of the trajectory.

In additional system embodiments, the left most through-traffic lane marking is associated with a left most lane of the first topology on which straight running traffic navigates, and the right most through-traffic lane marking is associated with a right most lane of the first topology on which the straight running traffic navigates.

In additional system embodiments, the method further includes validating the candidate storage lane marking based on additional lane marking associated with one or more nearby topologies that are within a second threshold distance from the first topology. The method further includes updating the map data with storage lane related data based on the validation. The candidate storage lane marking is invalid when the additional lane marking includes the candidate storage lane marking within a third threshold distance associated with the nearby topology. The method further includes validating the candidate storage lane marking based on a lane width associated with the first topology.

In yet another aspect, a computer program product comprising a non-transitory computer readable medium having stored thereon computer executable instructions which when executed by at least one processor, cause the processor to carry out operations for generating a storage lane marking, the operations comprising: generating a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology. The operations further include making a determination of whether the candidate storage lane marking is valid based on one or more of following: (i) whether one or more vehicle path locations are located within a polygon defined by (a) the candidate storage lane marking and (b) a corresponding edge of the first topology, or (ii) whether the candidate storage lane marking is located within another topology different from the first topology. Further, if the determination is that the candidate storage lane marking is invalid, then, responsive to the determination, the operations further include discarding or disregarding the candidate storage lane marking. Furthermore, if the determination is that the candidate storage lane marking is valid, then, responsive to the determination, the operations further include outputting the candidate storage lane marking.

In additional system embodiments, making the determination further includes determining that the candidate storage lane marking is valid if one or more vehicle path locations are located within the polygon. Further, making the determination includes determining that the candidate storage lane marking is valid if the candidate storage lane marking is not located within another topology.

In additional system embodiments, generating the candidate storage lane marking is further based on a lane width associated with the first topology. Further, the corresponding edge of the first topology is (i) the leftmost through-traffic lane marking if the candidate storage lane marking is generated to the left of the leftmost through-traffic lane marking or (ii) the rightmost through-traffic lane marking if the candidate storage lane marking is generated to the right of the rightmost through-traffic lane marking.

In additional system embodiments, the candidate storage lane marking is associated with a storage lane, such that the storage lane stores at least one of a left turning traffic or a right turning traffic associated with the first topology, when the at least one of the left turning traffic or the right turning traffic is in a waiting state. The operations further include estimating a geometry of a storage lane based on a trajectory formed by the one or more vehicle path locations and a subset of the lane marking data associated with the first topology, such that the subset of the lane marking data comprises lane marking detections within a first threshold distance of the trajectory.

In additional system embodiments, the left most through-traffic lane marking is associated with a left most lane of the first topology on which straight running traffic navigates, and the right most through-traffic lane marking is associated with a right most lane of the first topology on which the straight running traffic navigates.

In additional system embodiments, the operations further include validating the candidate storage lane marking based on additional lane marking associated with one or more nearby topologies that are within a second threshold distance from the first topology. The operations further include updating the map data with storage lane related data based on the validation. The candidate storage lane marking is invalid when the additional lane marking includes the candidate storage lane marking within a third threshold distance associated with the nearby topology. The operations further include validating the candidate storage lane marking based on a lane width associated with the first topology.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
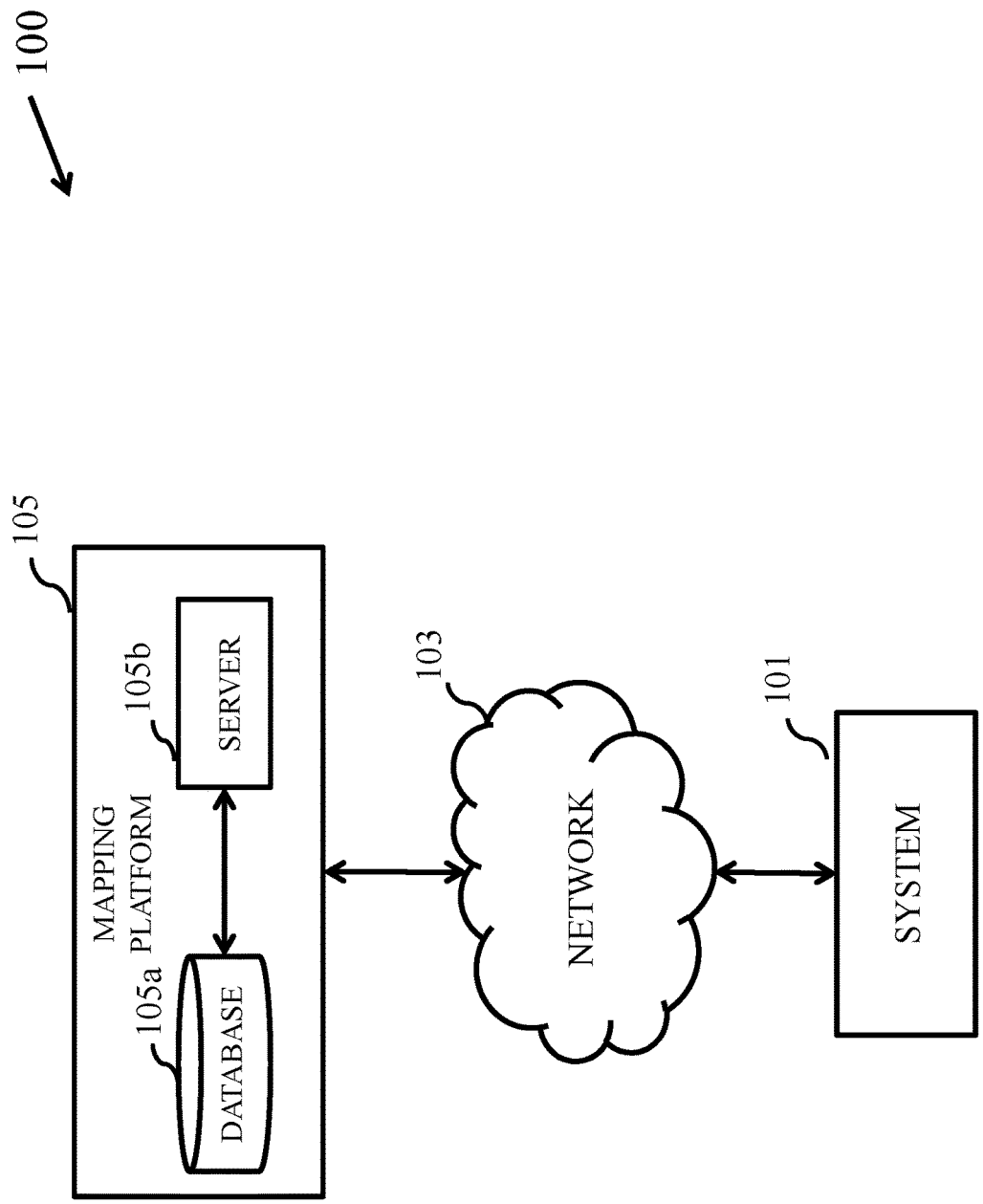

Having thus described example embodiments of the invention in general terms, reference will now be made to the accompanying drawings, which are not necessarily drawn to scale, and wherein:

FIG. 1 illustrates a block diagram showing an example architecture of a system for generating a storage lane marking, in accordance with one or more example embodiments.

Figure 2A:
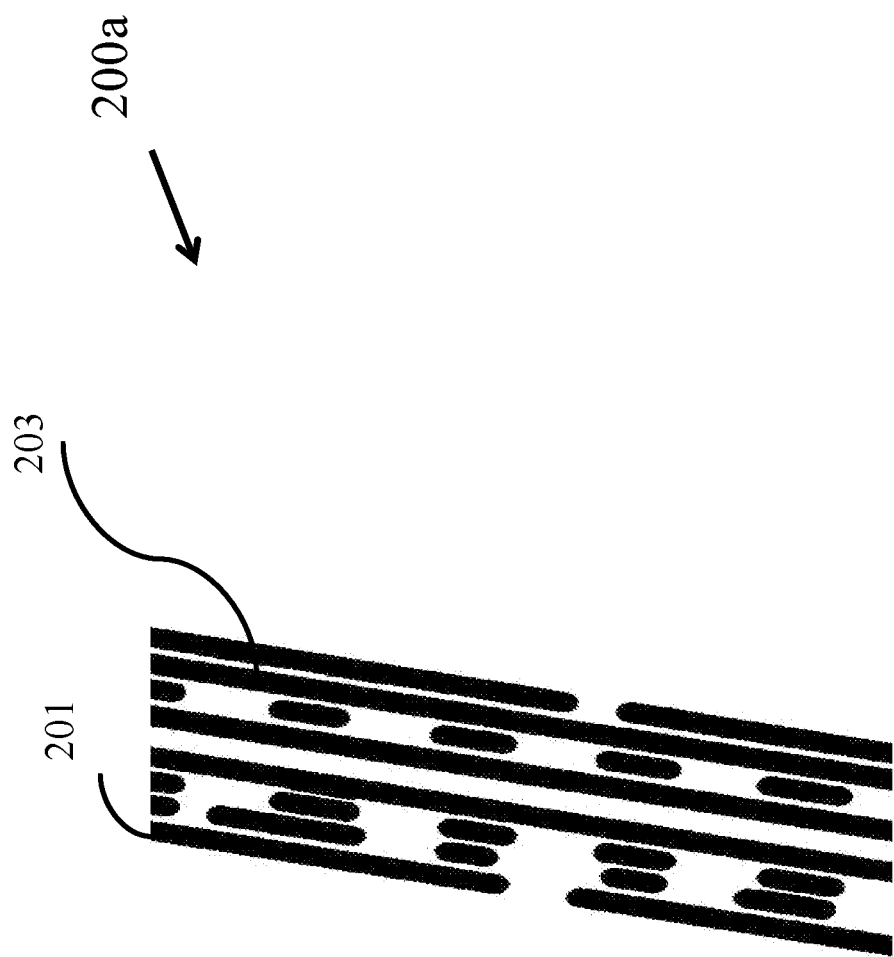

FIG. 2A illustrates an exemplary user interface showing different feature lines on a map for lane markings, in accordance with one or more example embodiments.

Figure 2B:
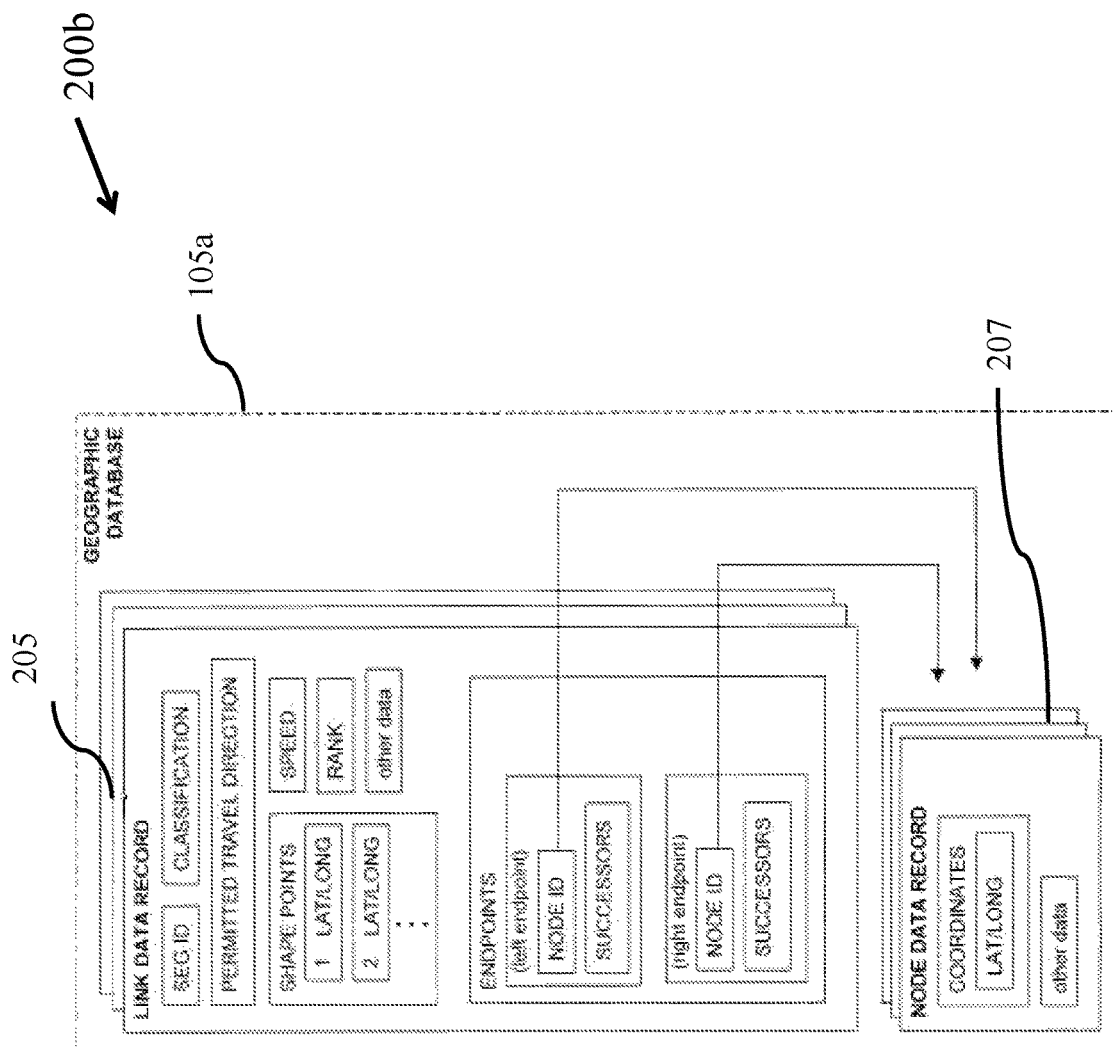

FIG. 2B illustrates an exemplary map data record storing data for feature lines shown in FIG. 2A, in accordance with one or more example embodiments.

Figure 2C:
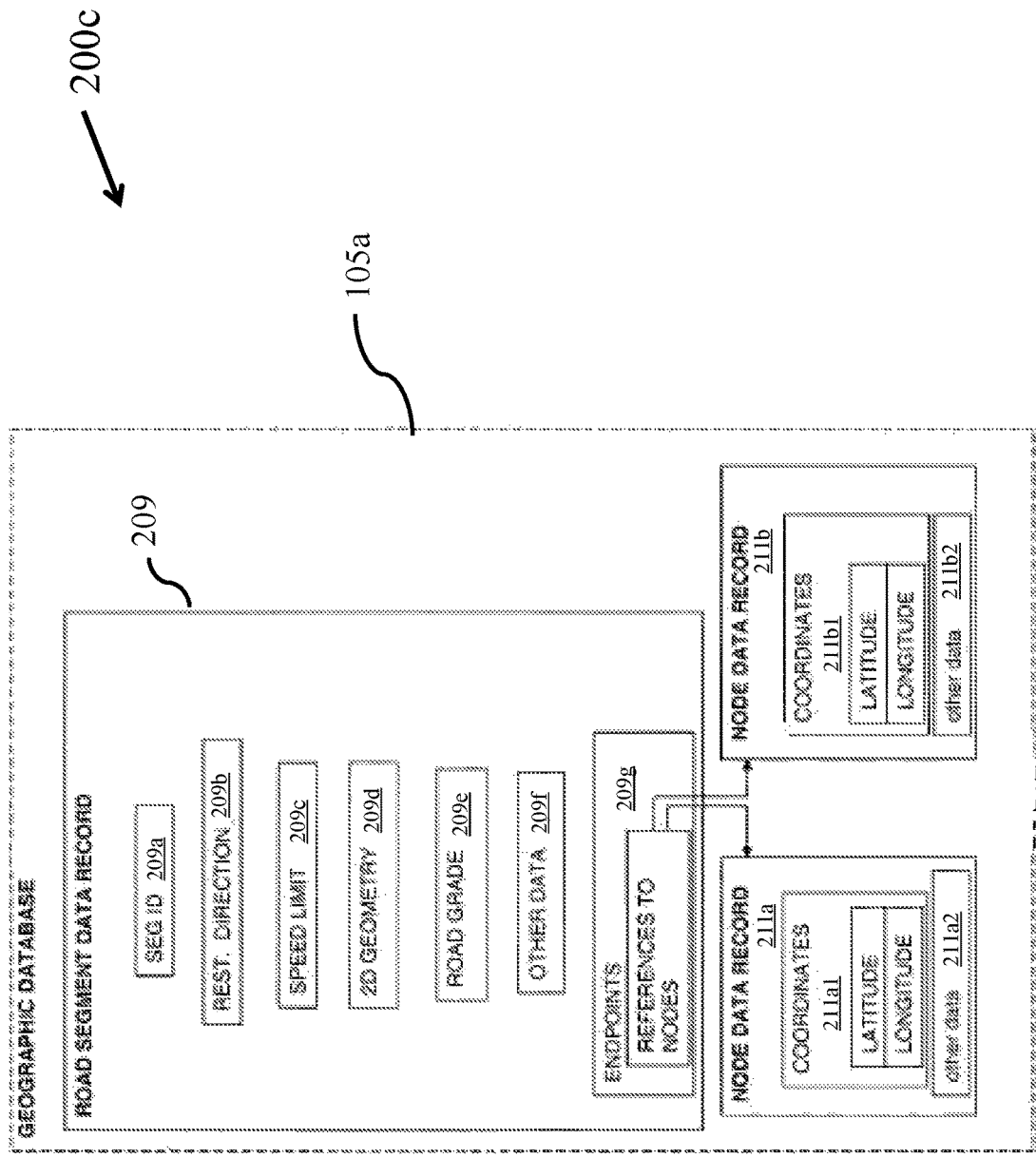

FIG. 2C illustrates another exemplary map database record storing data for feature lines shown in FIG. 2A, in accordance with one or more example embodiments.

Figure 2D:
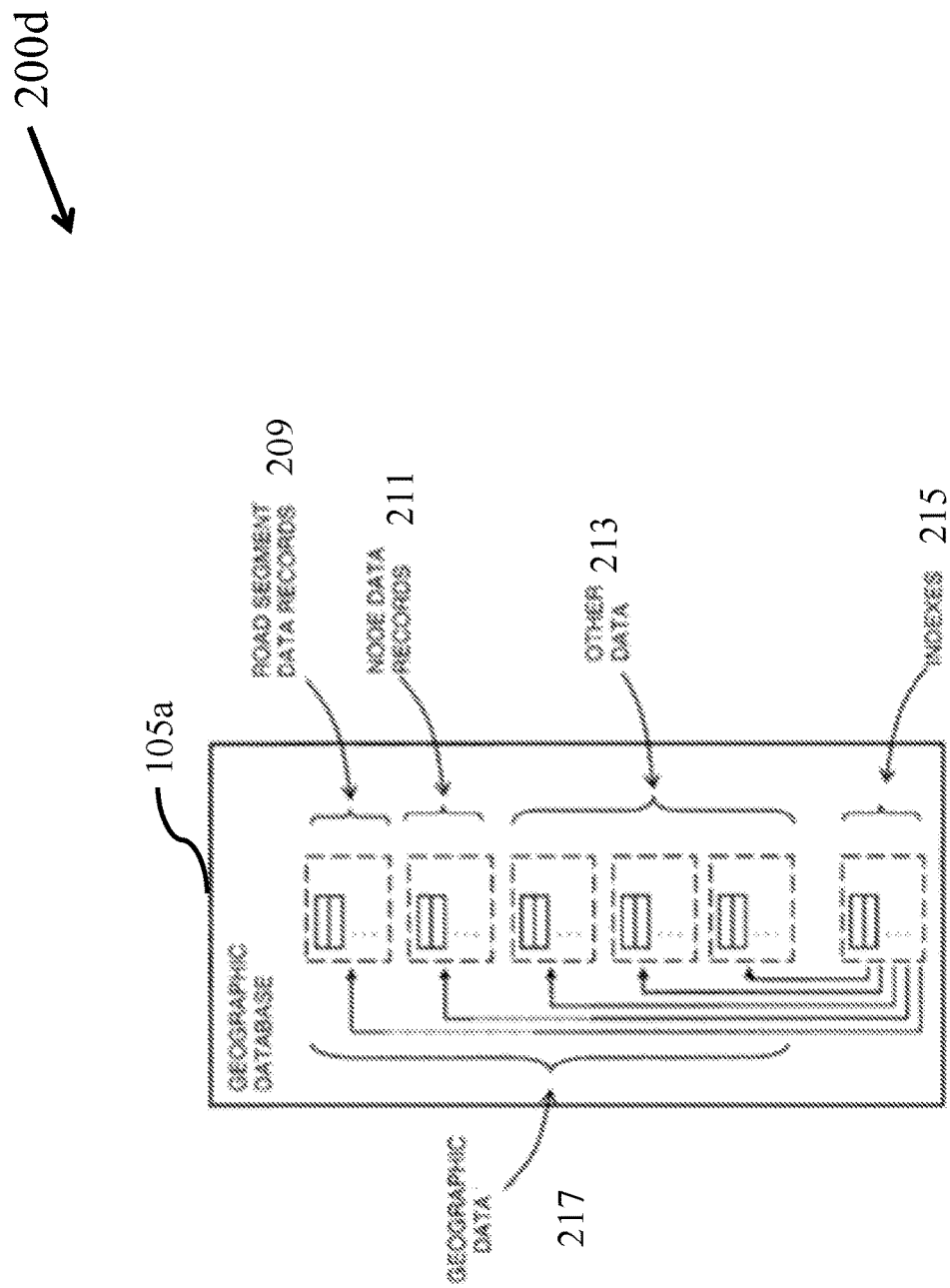

FIG. 2D illustrates an exemplary map database storing data for feature lines shown in FIGS. 2B and 2C, in accordance with one or more example embodiments.

Figure 3:
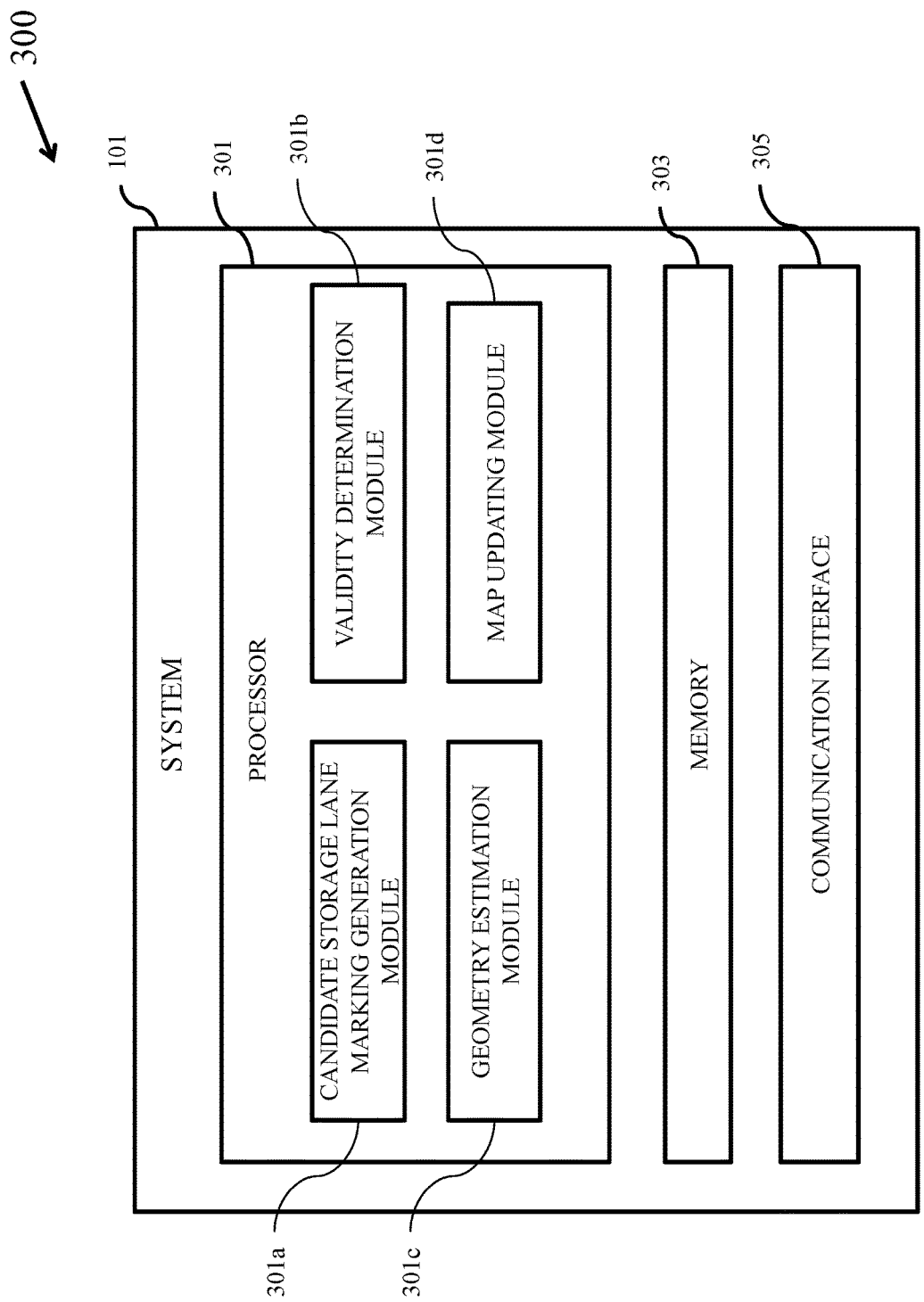

FIG. 3 illustrates an exemplary block diagram of a system for generating a storage lane marking, in accordance with one or more example embodiments.

Figure 4:
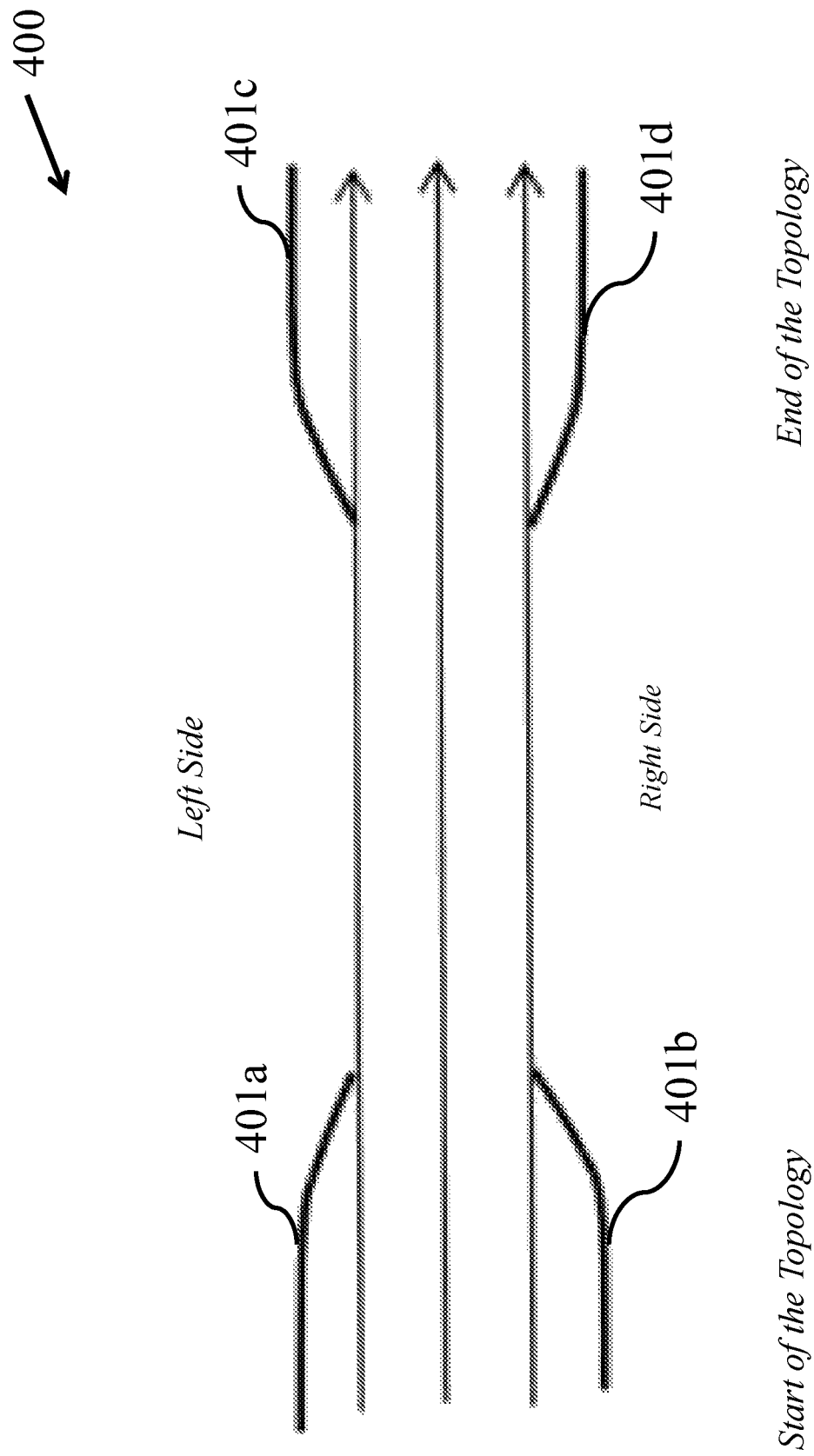

FIG. 4 illustrates a diagrammatic representation of a road topology with multiple lane markings and storage lane markings, in accordance with one or more example embodiments.

Figure 5:
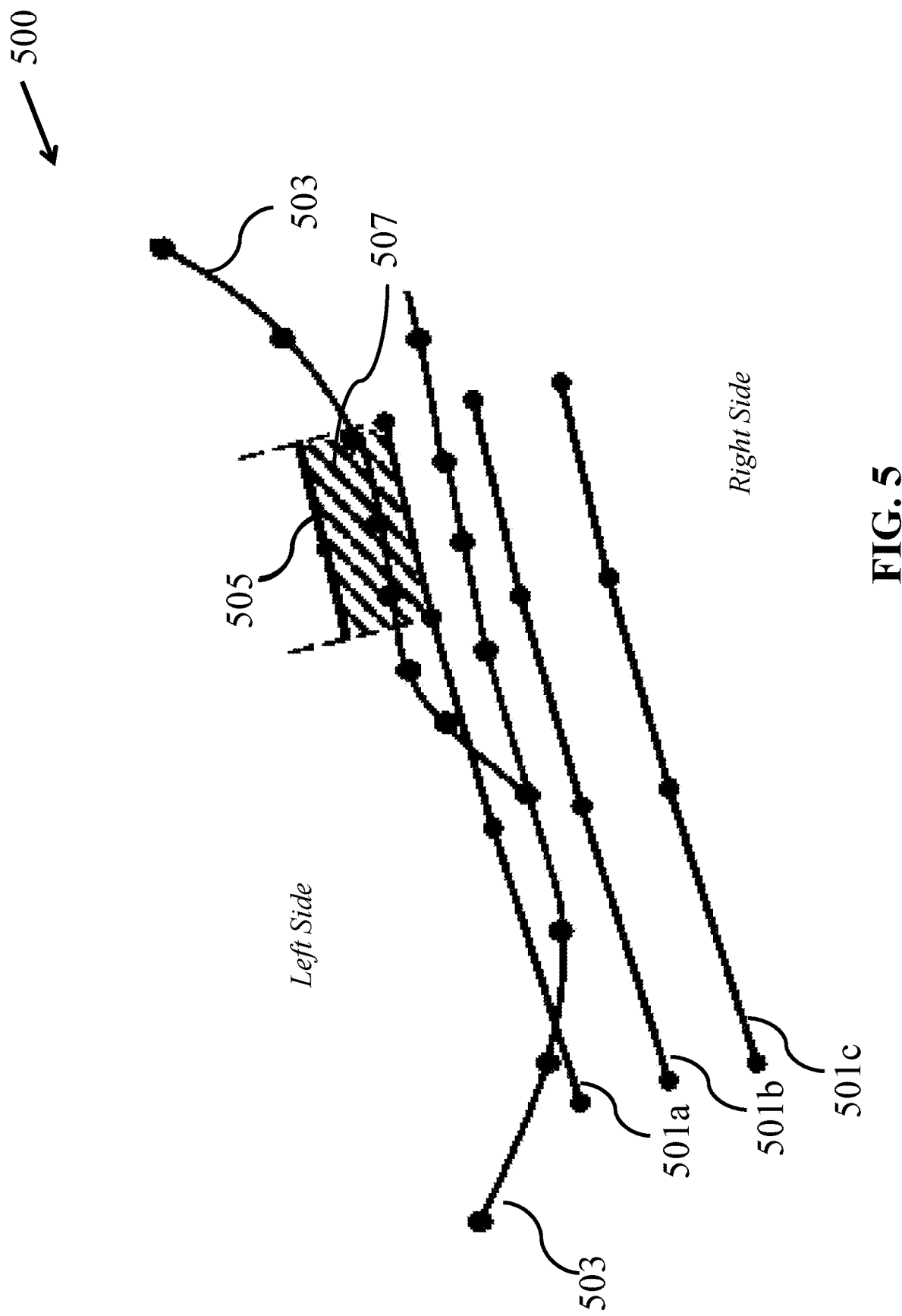

FIG. 5 illustrates another example diagrammatic representation of a road for generating of the candidate storage lane marking and determining validity of the candidate storage lane marking, in accordance with one or more example embodiments.

Figure 6:
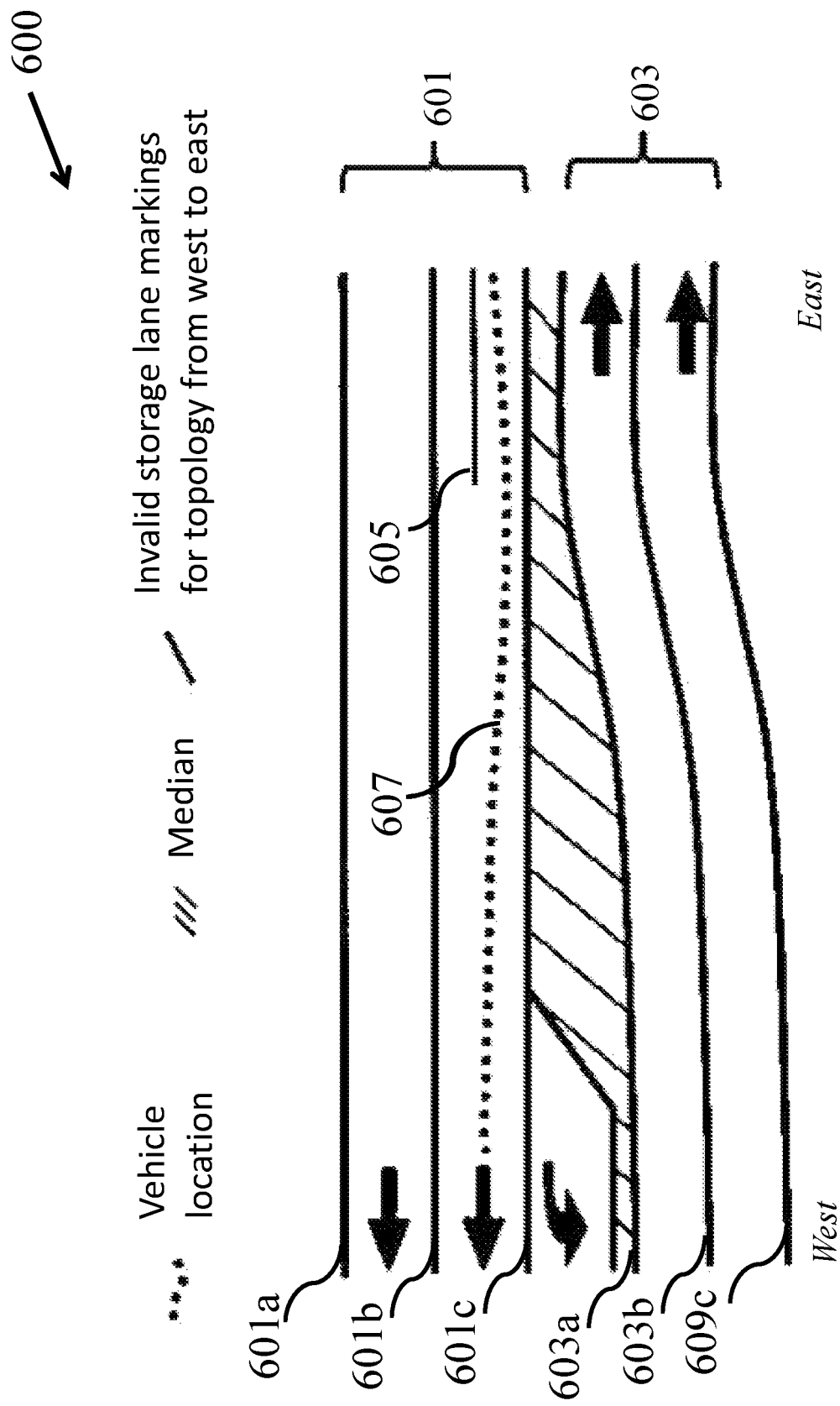

FIG. 6 illustrates another example diagrammatic representation of roads for generating of the candidate storage lane marking and determining validity of the candidate storage lane marking, in accordance with one or more example embodiments.

Figure 7:
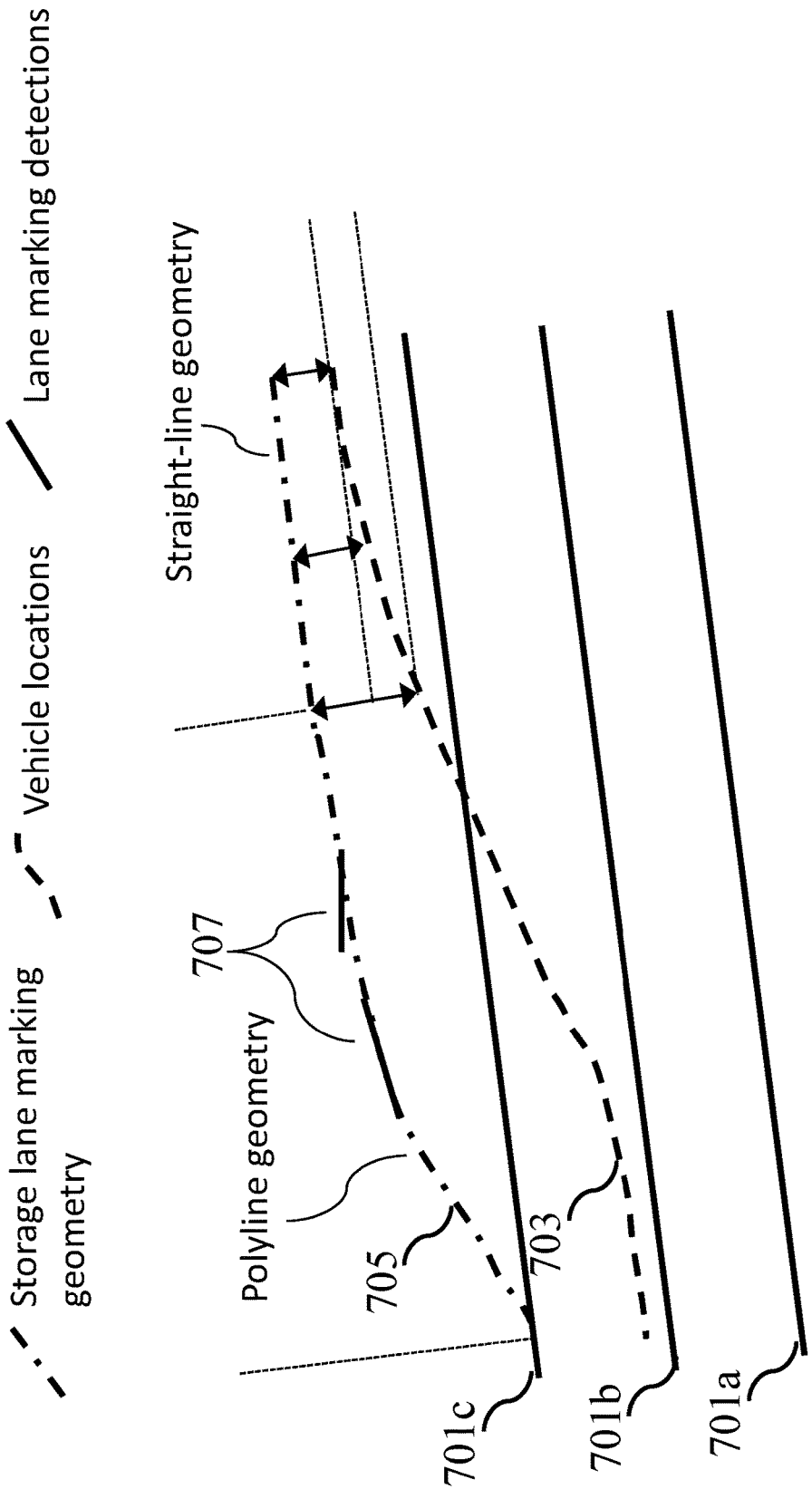

FIG. 7 illustrates a diagrammatic representation of a road for determining geometry of storage lane marking.

Figure 8:
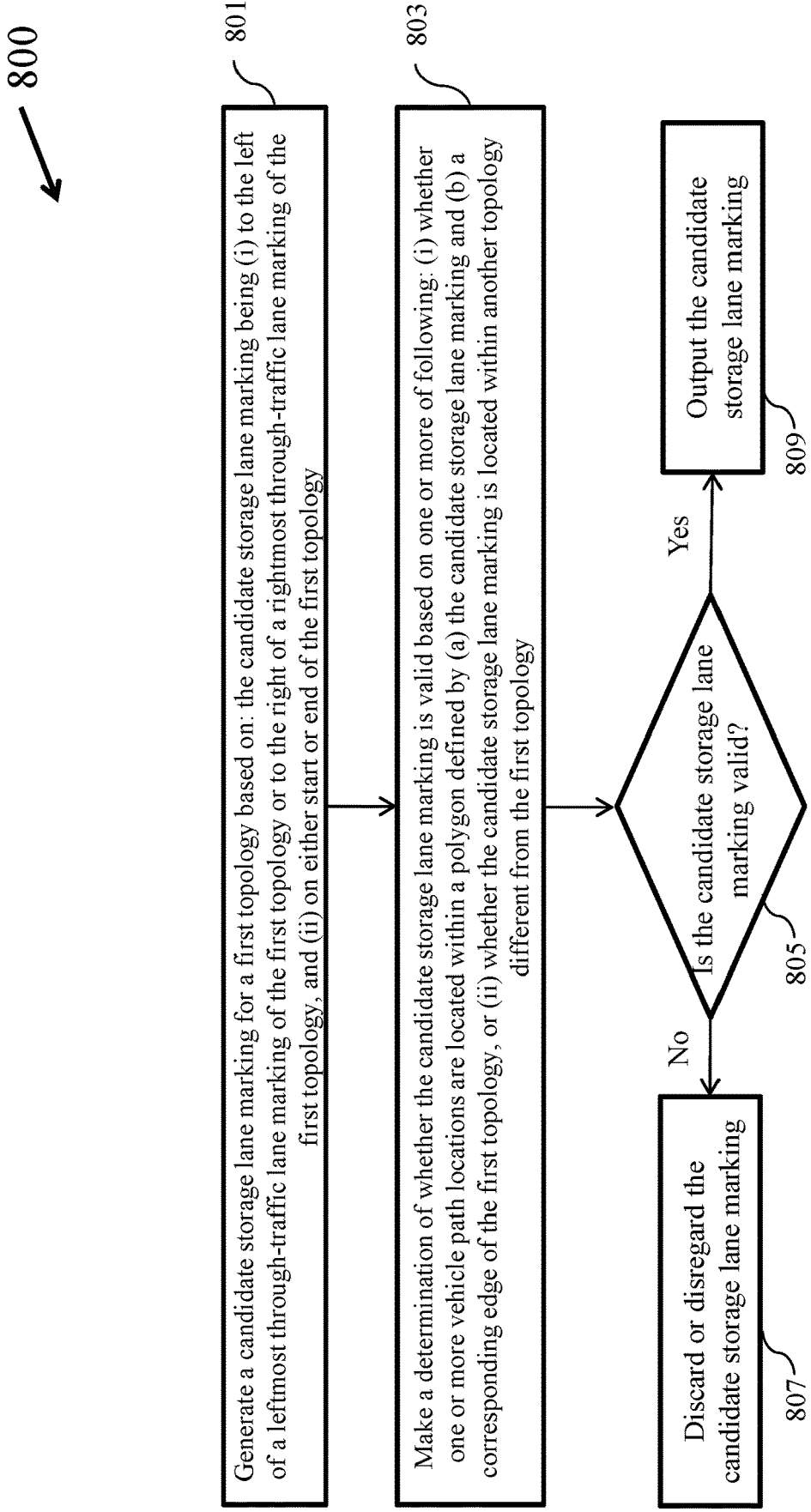

FIG. 8 is a flowchart of a method of generating a storage lane marking, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content,"

"information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1 illustrates a block diagram 100 showing an example architecture of a system 101 for generating a storage lane marking, in accordance with one or more example embodiments. As illustrated in FIG. 1, the block diagram 100 may comprise the system 101, a network 103, and a mapping platform 105. The mapping platform 105 may further comprise a map database 105a (also referred to as a geographic database 105a) and a server 105b. The components described in the block diagram 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In various embodiments, the system 101 may be onboard a vehicle, such as the system 101 may be a navigation system installed in the vehicle for detecting storage lane marking data and using this data for performing one or more navigation functions. In various embodiments, the vehicle may be an autonomous vehicle, a semiautonomous vehicle, or a manually operated vehicle. In some embodiments, the system 101 may be the server 105b of the mapping platform 105 and therefore may be co-located with or within the mapping platform 105. For example, the system 101 may be embodied as a cloud based service, a cloud based application, a cloud based platform, a remote server based service, a remote server based application, a remote server based platform, or a virtual computing system. In some other embodiments, the system 101 may be an OEM (Original Equipment Manufacturer) cloud. The OEM cloud may be configured to anonymize any data received from the system 101, such as the vehicle, before using the data for further processing, such as before sending the data to the mapping platform 105. In some embodiments, anonymization of data may be done by the mapping platform 105.

In some embodiments, the system 101 may comprise one or more user equipment for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure.

In some example embodiments, the user equipment may be any user accessible device such as a mobile phone, a smartphone, a portable computer, and the like that are portable in themselves or as a part of another portable/mobile object such as the vehicle. The user equipment may comprise a processor, a memory, and a communication interface. The processor, the memory, and the communication interface may be communicatively coupled to each other. In some example embodiments, the user equipment is associated, coupled, or otherwise integrated with the vehicle, such as an advanced driver assistance system (ADAS), a personal navigation device (PND), a portable navigation device, an infotainment system and/or other device that may be configured to provide route guidance and navigation related functions to the user. In such example embodiments, the user equipment comprises processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment. For example, the user equipment may be configured to execute and run mobile applications such as a messaging application, a browser application, a navigation application, and the like.

In one embodiment, the user equipment may be directly coupled to the system 101 via the network 103. In another embodiment, the user equipment may be coupled to the system 101 via the OEM cloud and the network 103. For example, the user equipment may be a consumer vehicle (or a part thereof) and may be a beneficiary of the services provided by the system 101. In some example embodiments, the user equipment may serve the dual purpose of a data gatherer and a beneficiary device. For example, the user equipment may be installed in the vehicle and is configured to detect storage lane marking on links and/or road segments by using image-based sensors installed in the vehicle.

Further, the system 101 may be communicatively coupled with the mapping platform 105 over the network 103. The network 103 may be wired, wireless, or any combination of wired and wireless communication networks, such as cellular, Wi-Fi, internet, local area networks, or the like. In some embodiments, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

The system 101 may communicate with the mapping platform 105, via the network 103, where the mapping platform 105 may comprise the map database 105a for storing map data, and the processing server 105b for carrying out the processing functions associated with the mapping platform 105. The map database 105a may store node data, road segment data or link data, point of interest (POI) data, road obstacles related data, traffic objects related data, posted signs related data, such as road sign data, sensor data related to permissible driving directions, data about valid paths based on legally permissible road geometries or the like. The map database 105a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. For example, the node data may represent data for intersections. The road/link data and the node data may represent a road network, such as used by vehicles, for example, cars, trucks, buses, motorcycles, and/or other entities.

Optionally, the map database 105a may contain path segment and node data records or other data that may represent pedestrian paths or areas in addition to or instead of the vehicle road record data, for example. The road/link segments and nodes may be associated with attributes, such as geographic coordinates, lane data records and other navigation related attributes, as well as POIs, such as fueling stations, hotels, restaurants, museums, stadiums, offices, auto repair shops, buildings, stores, parks, etc. The lane data records may comprise data related a number of lanes on a particular link/road segment, a number of lanes for a particular link/road segment determined by visual inspection, data about feature lines forming lane markings and the like. Additionally, the lane data records may comprise legal travel directions (travel directions that the vehicles should follow while traveling on lanes of a particular link/road segment), lane level speed profile (historically derived speed limits for a lane), lane level maneuver pattern (lane change patterns at intersections), and the like.

The map database 105a may include data about the POIs and their respective locations in the POI records. The map database 105a may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 105a may include event data (e.g., traffic incidents, construction activities, scheduled events, unscheduled events, etc.) associated with the POI data records or other records of the map database 105a. The map database 105a may additionally include data related to road signs, road obstacles, traffic objects and the like. The map database may be communicatively coupled to the processing server 105b.

In one embodiment, the map or geographic database 105a may be maintained by a content provider in association with the mapping platform 105 (e.g., a map developer). The map developer may collect geographic data to generate and enhance the geographic database 105a. There may be different ways used by the map developer to collect data. These ways may include obtaining data from other sources, such as municipalities or respective geographic authorities. In addition, the map developer may employ field personnel to travel by vehicle (e.g., vehicles and/or user terminals) along roads throughout the geographic region to observe features and/or record information about them, for example. Such data may form part of ground truth data records stored in the mapping platform 105. In an alternate embodiment, the ground truth data of the ground truth data records may be collected by a ground truth recorder device installed in the ground truth vehicle. As used herein, the 'ground truth vehicle' may correspond to a vehicle manually driven by human for collecting the ground truth data. As used herein, the ground truth recorder device may be a device (comprising memory and processor) to record a ground truth vehicle location (also referred to as ground truth location data) and data about a road object, when the road object is observed, and the road object is applicable on a link in which the ground truth vehicle is currently travelling.

In some embodiments, the map data may be collected by end-user vehicles which use vehicles' on-board sensors to detect data about various entities such as road objects, lane markings, links, and the like. These end-user vehicles are also referred to as probe vehicles and form an alternate form of data source for map data collection, along with ground truth data. Additionally, data collection mechanisms like remote sensing, such as aerial or satellite photography, may be used to collect the data for the map database 105a.

The map database 105a may be a master geographic database stored in a format that facilitates updating, maintenance, and development. According to some embodiments, the map data in the map database 105a may be stored as a digital map. The digital map may correspond to a high-definition map or a fast map, which is formed on the basis of satellite raster imagery, bitmap imagery, or the like. The satellite rater imagery/bitmap imagery may include map features (such as road/link segments, nodes, feature lines for lane markings and the like) and attributes associated with the map features. In some embodiments, the map features may have a vector representation form. Additionally, the satellite raster imagery may include three dimensional (3D) map data that corresponds to 3D map features, which are defined as vectors, voxels, or the like. In these embodiments, the digital map may be divided into map tiles. Each map tile of the digital map may define a geographic region. The geographic region may include one or more link segments, one or more nodes associated with the one or more link segments, and the attributes associated with the one or more link segments. For example, the geographic region may include a ramp road geometry having a main link segment, a ramp link segment, a ramp start location, and attributes associated with the main link segment and the ramp link segment. The main link segment may correspond to freeway, motorway, expressway, highway, and the like. The ramp link segment may correspond to at least one of an exit-ramp or entrance ramp link associated with the main link segment.

In some embodiments, the map database 105a is a master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data is compiled (such as into a platform specification format (PSF) format) to organize and/or configure the data for performing navigation-related functions and/or services, such as maneuvering of an autonomous vehicle, route calculation, route guidance, map display, speed calculation, distance and travel time functions, and other functions, by a navigation device, such as by a vehicle or a user terminal, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The processing server 105b may comprise one or more processors configured to process requests received from the system 101. The processor may fetch map data from the map database 105a and transmit the same to the system 101 in a format suitable for use by the system 101. In some example embodiments, as disclosed in conjunction with the various embodiments disclosed herein, the system 101 may be used to generate one or more storage lane markings of the map data stored in the map database 105a.

FIG. 2A illustrates an exemplary user interface 200a showing different types of feature lines on a mapping interface. The user interface 200a may be associated with one or more user equipment installed in the vehicle discussed in conjunction with FIG. 1. The user interface 200a may be configured to display images about various navigation entities in the form of high definition maps, where clarity and resolution of images is high (such as of the order of 320 dpi), and the information displayed about the navigation entities on the maps is collected using data sources beyond the on-board vehicle sensors only, to provide most accurate, up-to-date and real time map data. The accuracy of data is important, especially for maneuvering and control of autonomous vehicles. However, as depicted in the user interface 200a, sometimes this map data may be incomplete. In particular, the map data may lack storage lane markings, amongst other features. For example, on the user interface 200a, feature line 201 is having discontinuities as some parts are missing in the feature line 201, making it appear dashed, rather than in the form of a continuous line on the user interface 200a. On the other hand, feature line 203 is a complete feature line, without any discontinuities. However, the objective of the methods and systems (such as the system 101) disclosed herein, is to generate the missing storage lane markings, accurate navigation.

FIG. 2B shows format of the map data 200b stored in the map database 105a according to one or more example embodiments. FIG. 2B shows a link data record 205 that may be used to store data about one or more of the feature lines, that is the feature line 201 and the feature line 203, illustrated in FIG. 2A. This link data record 205 has information (such as "attributes", "fields", etc.) associated with it that allows identification of the nodes associated with the link and/or the geographic positions (e.g., the latitude and longitude coordinates and/or altitude or elevation) of the two nodes. In addition, the link data record 205 may have information (e.g., more "attributes", "fields", etc.) associated with it that specify the permitted speed of travel on the portion of the road represented by the link record, the direction of travel permitted on the road portion represented by the link record, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the mapping platform 105 and its associated map database developer selects one or more shape points along the other-than-straight road portion. Shape point data included in the link data record 205 indicate the position, (e.g., latitude, longitude, and optionally, altitude or elevation) of the selected shape points along the represented link.

Additionally, in the compiled geographic database, such as a copy of the map database 105a that is compiled and provided to the user interface 200a, there may also be a node data record 207 for each node. The node data record 207 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function, but excludes data and attributes that are not needed for performing the function. Thus, the map data may be alternately stored in a format suitable for performing types of navigation functions, and further may be provided on-demand, depending on the type of navigation function.

FIG. 2C shows another format of the map data 200c stored in the map database 105a according to one or more example embodiments. In the FIG. 2C, the map data 200c is stored by specifying a road segment data record 209. The road segment data record 209 is configured to represent data that represents a road network. In FIG. 2C, the map database 105a contains at least one road segment data record 209 (also referred to as "entity" or "entry") for each road segment in a geographic region, such as the region shown by user interface 200a having feature lines 201 and 203, in FIG. 2A.

The map database 105a that represents the geographic region of FIG. 2A also includes a database record 211 (a node data record 211a and a node data record 211b) (or "entity" or "entry") for each node associated with the at least one road segment shown by the road segment data record 209. (The terms "nodes" and "segments" represent only one terminology for describing these physical geographic features and other terminology for describing these features is intended to be encompassed within the scope of these concepts). Each of the node data records 211a and 211b may have associated information (such as "attributes", "fields", etc.) that allows identification of the road segment(s) that connect to it and/or its geographic position (e.g., its latitude and longitude coordinates).

FIG. 2C shows some of the components of the road segment data record 209 contained in the map database 105a. The road segment data record 209 includes a segment ID 209a by which the data record can be identified in the map database 105a. Each road segment data record 209 has associated with it information (such as "attributes", "fields", etc.) that describes features of the represented road segment. The road segment data record 209 may include data 209b that indicate the restrictions, if any, on the direction of vehicular travel permitted on the represented road segment. The road segment data record 209 includes data 209c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 209 may also include data 209d indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 209 also includes road grade data 209e that indicate the grade or slope of the road segment. In one embodiment, the road grade data 209e include road grade change points and a corresponding percentage of grade change. Additionally, the road grade data 209e may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 209e includes the road grade change points and an actual road grade value for the portion of the road segment after the road grade change point until the next road grade change point or end node. In a further embodiment, the road grade data 209e includes elevation data at the road grade change points and nodes. In an alternative embodiment, the road grade data 209e is an elevation model which may be used to determine the slope of the road segment.

The road segment data record 209 also includes data 209g providing the geographic coordinates (e.g., the latitude and longitude) of the end points of the represented road segment. In one embodiment, the data 209g are references to the node data records 209 that represent the nodes corresponding to the end points of the represented road segment.

The road segment data record 209 may also include or be associated with other data 209f that refer to various other attributes of the represented road segment. The various attributes associated with a road segment may be included in a single road segment record, or may be included in more than one type of record which cross-reference each other. For example, the road segment data record 209 may include data identifying the name or names by which the represented road segment is known, the street address ranges along the represented road segment, and so on.

FIG. 2C also shows some of the components of the node data record 211 contained in the map database 105a. Each of the node data records 211 may have associated information (such as "attributes", "fields", etc.) that allows identification of the road segment(s) that connect to it and/or it's geographic position (e.g., its latitude and longitude coordinates). For the embodiment shown in FIG. 2C, the node data records 211a and 211b include the latitude and longitude coordinates 211a1 and 211b1 for their nodes. The node data records 211a and 211b may also include other data 211a2 and 211b2 that refer to various other attributes of the nodes. In some embodiments, the node data records 211a and 211b may be associated with at least one first point and at least one second point, which may be border points of a storage line to be generated.

Thus, the overall data stored in the map database 105a may be organized in the form of different layers for greater detail, clarity and precision. Specifically, in the case of high definition maps, the map data may be organized, stored, sorted and accessed in the form of three or more layers. These layers may include road level layer, lane level layer and localization layer. The data stored in the map database 105a in the formats shown in FIGS. 2B and 2C may be combined in a suitable manner to provide these three or more layers of information. In some embodiments, there may be lesser or fewer number of layers of data also possible, without deviating from the scope of the present disclosure.

FIG. 2D illustrates a block diagram 200d of the map database 105a storing map data or geographic data 217 in the form of road segments/links, nodes, and one or more associated attributes as discussed above. Furthermore, attributes may refer to features or data layers associated with the link-node database, such as an HD lane data layer.

In addition, the map data 217 may also include other kinds of data 213. The other kinds of data 213 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The map database 105a also includes indexes 215. The indexes 215 may include various types of indexes that relate the different types of data to each other or that relate to other aspects of the data contained in the geographic database 105a.

The data stored in the map database 105a in the various formats discussed above may help in provide precise data for high definition mapping applications, autonomous vehicle navigation and guidance, cruise control using ADAS, direction control using accurate vehicle maneuvering and other such services. In some embodiments, the system 101 accesses the map database 105a storing data in the form of various layers and formats depicted in FIGS. 2B-2D, to generate a storage lane marking.

FIG. 3 illustrates a block diagram 300 associated with the system 101, for providing capabilities for generating a storage lane marking, in accordance with an embodiment disclosed herein.

The system 101 may include at least one processor 301, a memory 303, and at least one communication interface 305. The at least one processor 301 may comprise a candidate storage lane marking generation module 301a and a validity determination module 301b. Additionally, the at least one processor 301 may comprise a geometry estimation module 301c and a map updating module 301d.

The candidate storage lane marking generation module 301a may be configured to generate a candidate storage lane marking for a first topology. In an embodiment, the candidate storage lane marking generation module 301a may generate the candidate storage lane marking for the first topology based on the candidate storage lane marking being to the left of a leftmost through-traffic lane marking of the first topology or to the right of a rightmost through-traffic lane marking of the first topology. In an alternate embodiment, the candidate storage lane marking generation module 301a may generate the candidate storage lane marking for the first topology based on either start or end of the first topology.

As will be understood, the storage lane is an auxiliary lane required to store vehicles likely to accumulate in the lane. Therefore, it should be noted that the candidate storage lane marking is associated with a storage lane, wherein the storage lane stores one of a left turning traffic or a right turning traffic associated with the first topology, when the left turning traffic or the right turning traffic is in a waiting state. The candidate storage lane marking generation module 301a and its associated functionality will be discussed in conjunction with the description of FIG. 4 provided herein.

FIG. 4 illustrates a diagrammatic representation of a road topology 400 with multiple lane markings and storage lane markings. It should be noted that for each topology, storage lane markings can be located on either side of the topology, as well as on either start or end of the topology. As shown in FIG. 4, the road topology 400 includes a left incoming storage lane marking 401a, a right incoming storage lane marking 401b, a left outgoing storage lane marking 401c, and a right outgoing storage lane marking 401d. As such, the left incoming storage lane marking 401a and the left outgoing storage lane marking 401c are located in the left side of the topology 400. The right incoming storage lane marking 401b and the right outgoing storage lane marking 401d are located in the right side of the topology 400. Further, the left incoming storage lane marking 401a and a right incoming storage lane marking 401b are located on the start of the topology 400. The left outgoing storage lane marking 401c and the right outgoing storage lane marking 401d are located on the end of the topology 400.

In order to determine the storage lane marking on the road topology, various candidate locations are estimated for potential storage lane markings on the road topology. In each candidate location, it is also possible that there are more than one storage lanes and consequently more than one storage lane markings. As such, a candidate storage lane marking for the topology 400 may be generated based on the candidate storage lane marking being to the left of a leftmost through-traffic lane marking of the topology 400 or to the right of a rightmost through-traffic lane marking of the topology 400, and on either start or end of the topology 400. Once, the candidate storage lane markings have been generated, it is also important to determine which of the generated storage lane markings are valid markings. Generation of the candidate storage lane marking and determination of the validity of the candidate storage lane marking are further explained in conjunction with FIGS. 5 and 6.

FIG. 5 illustrates a diagrammatic representation of a road 500, for generating of the candidate storage lane marking and determining validity of the candidate storage lane marking. The representation of the road 500 includes a at least a portion of a single road topology (or simply "topology"). Further, the topology includes a plurality of through-traffic lane markings 501a, 501b, 501c.

In this arrangement, the candidate storage lane marking generation module 301a can generate a candidate storage lane marking 505. Such a candidate storage lane marking can be generated based on the candidate storage lane marking being to the left of a leftmost through-traffic lane marking of the topology or to the right of a rightmost through-traffic lane marking of the first topology and on either start or end of the first topology. As shown in FIG. 5, the candidate storage lane marking 505 is generated to the left of the leftmost through-traffic lane markings 501a.

Additionally, in an embodiment, the storage lane marking location can be determined based on the most probable lane width on the topology. In other words, generating the candidate storage lane marking is further based on a lane width associated with the topology.

It should be noted that a curvature or a length of the storage lane marking may not be available, and the initial location may be only a part of the storage lane markings. Based on the initial storage lane marking location, a polygon 507 can be built. The polygon 507 may be defined by a candidate storage lane marking and a corresponding edge of the first topology. As shown in FIG. 5, the polygon 507 is defined by a candidate storage lane marking 505 and a corresponding edge of the first topology.

In an embodiment, the corresponding edge of the first topology may be the leftmost through-traffic lane marking if the candidate storage lane marking is generated to the left of the leftmost through-traffic lane marking, i.e. 501a. Alternately, in an embodiment, the corresponding edge of the first topology may be the rightmost through-traffic lane marking if the candidate storage lane marking is generated to the right of the rightmost through-traffic lane marking, i.e. 501c. Therefore, in FIG. 5, the polygon 507 is defined by a candidate storage lane marking 505 and a corresponding edge of the first topology, i.e. the leftmost through-traffic lane marking 501a. It should be noted that the left most through-traffic lane marking 501a is associated with a left most lane of the first topology on which the through-traffic navigates. Further, the right most through-traffic lane marking 501c is associated with a right most lane of the first topology on which the through-traffic navigates.

Once the candidate storage lane marking for a first topology is generated, the validity determination module 301b may make a determination of whether the candidate storage lane marking is valid or not. Further, in FIG. 5, a vehicle path 503 on the road topology is shown. The validity determination module 301b may make this determination based on whether one or more vehicle path locations are located within a polygon defined by (a) the candidate storage lane marking and (b) a corresponding edge of the first topology. Additionally or alternatively, the validity determination module 301b may make the determination based whether the candidate storage lane marking is located within another topology different from the first topology.

By way of example, in order to make a determination of whether the candidate storage lane marking is valid or not, the validity determination module 301b may check whether one or more vehicle path locations are located within this polygon 507 defined by the candidate storage lane marking 505 and the corresponding edge of the first topology 501a. For instance, a point-in polygon method may be used in order to check if there are vehicle path locations located in the polygon 507. Alternately, in order to make a determination of whether the candidate storage lane marking is valid, the validity determination module 301b may check whether the candidate storage lane marking 505 is located within another topology different from the first topology.

In an embodiment, making the validity determination may include determining that the candidate storage lane marking is valid if one or more vehicle path locations are located within the polygon. In other words, if the validity determination module 301b determines one or more vehicle path locations 503 to be located within the polygon 507, then the candidate storage lane marking 505 may be determined to be valid. Additionally or alternatively, in an embodiment, making the determination may include determining that the candidate storage lane marking is valid if the candidate storage lane marking is not located within another topology. In other words, if the validity determination module 301b determines the candidate storage lane marking 505 to be not located within another topology, the candidate storage lane marking 505 is determined to be valid.

Therefore, an existence of candidate storage lane markings is proved based on the in-polygon vehicle locations. In other words, a location is considered as a candidate storage lane marking location, when there is an existence of a vehicle location within the polygon. However, some of the candidate storage lane markings may be false-positive cases. This is because some of the in-polygon vehicle path locations are recorded by vehicles running on other topologies, especially when there are road topologies close to the current one (i.e., there are more than one topologies present). In such cases, the candidate storage lane markings can be further validated by lane marking detections on other topologies. This is further explained in detail conjunction with FIG. 6.

FIG. 6 illustrates another diagrammatic representation of a road 600. The representation of the road 600 includes two topologies—a first road topology 601 comprising lane markings 601a, 601b, 601c, and a second road topology 603 comprising lane markings 603a, 603b, 603c. The representation of the road 600 further shows a vehicle location path 607. As mentioned above, the validity determination module 301b determines that the candidate storage lane marking of a road topology is valid if the candidate storage lane marking is not located within another road topology. Alternatively, the validity determination module 301b determines that the candidate storage lane marking of a road topology is valid if the candidate storage lane marking is not located within a threshold distance from another road topology. In other words, the validity determination module 301b determines that the candidate storage lane marking is invalid if the candidate storage lane marking is located within another topology or within a threshold distance from another topology. Therefore, candidate storage lane markings can be further removed by comparing with the lane marking detections on another road topology (the first road topology 601 in this example). The candidate storage lane marking is invalid if it is within the polygon of any lane marking detections in the other road topologies.

As shown in FIG. 6, a candidate storage lane marking 605 is generated by the candidate storage lane marking generation module 301a for the second road topology 603. The validity determination module 301b may determine the candidate storage lane marking 605 to be invalid, due to the reason the candidate storage lane marking 605 lying in another road topology i.e., the first road topology 601. The candidate storage lane marking 605 fulfills the criteria of one or more vehicle path locations, i.e. the vehicle location path 607, located within a polygon defined by (a) the candidate storage lane marking 605 and (b) a corresponding edge 603a of the second road topology 603. However, the candidate storage lane marking 605 does not fulfill the criteria of candidate storage lane marking being not located within another topology. As shown in FIG. 6, the candidate storage lane marking 605 is located within another road topology (the first road topology 601 in this example). Therefore, the candidate storage lane marking 605 is found to be invalid for the second road topology 603 (from West to East).

Additionally, in an embodiment, the geometry estimation module 301c may estimate a geometry of a storage lane. The geometry estimation module 301c may estimate the geometry of the storage lane based on a trajectory formed by the one or more vehicle path locations and a subset of the lane marking data associated with the road topology. The subset of the lane marking data includes lane marking detections within a first threshold distance of the trajectory. Estimation of the geometry of the storage lane is further explained in conjunction with FIG. 7.

FIG. 7 illustrates a diagrammatic representation of a road 700. The representation of the road 700 includes lane markings 701a, 701b, 701c for the road topology. The representation of the road 700 further includes a vehicle location path 703, and a storage lane marking 705. In order to estimate the geometry of a storage lane 705, the geometry estimation module 301c may determine a trajectory formed by the one or more vehicle path locations 703 and a subset of the lane marking data (i.e. of the lane markings 701a, 701b, 701c) associated with the topology as shown in FIG. 7. The subset of the lane marking data includes lane marking detections within a first threshold distance of the trajectory. The first threshold distance of the trajectory may be predetermined. The subset of lane marking data may correspond to the lane marking 701c which is nearest to the trajectory formed by the one or more vehicle path locations 703.

Additionally, in an embodiment, the geometry estimation module 301c may determine the storage lane marking geometry based on the vehicle path 703. The storage lane marking 705 is a polyline that merges into or splits from the through-traffic lane marking. To reveal the polyline geometry of the storage lane marking 705, both the vehicle path locations and lane marking detections are employed as reference locations. As vehicles travel within lanes, the storage lane marking geometry should be similar to the vehicle path location geometry. Thus, vehicle path locations can be taken as a reference to reconstruct the storage lane marking geometry. However, sometimes the vehicles may merge into the through the traffic or split from the traffic in the middle of the storage lanes. Therefore, first, the straight-line geometry is estimated using the vehicle path locations. Thereafter, the polyline geometry is estimated using the lane marking detections located on the right or left side of the through-traffic lane markings.

As shown in FIG. 7, the storage lane marking 705 consists of two part: (i) straight-line geometry and (ii) polyline geometry. In an embodiment, the geometry estimation module 301c may determine the straight-line geometry using the vehicle path 703 as a reference. The referencing to the vehicle path locations stops when the lateral distance between the vehicle path location and the candidate storage lane marking is larger than a threshold. This threshold may be predetermined. Thereafter, the polyline geometry of the storage lane marking is estimated using lane marking detections. In an embodiment, the geometry estimation module 301c may determine the polyline geometry based on a subset of the storage lane markings. The polyline geometry may be estimated using lane marking detections 701c or 707, or a combination thereof. The lane marking detection 707 may be an additional lane marking which is within a threshold distance from the through-lane markings.

In an embodiment, the candidate storage lane marking may be further validated based on additional lane marking associated with one or more nearby topologies that are within a second threshold distance from the first topology. The second threshold distance may be predetermined.

The map updating module 301d may update the map data with storage lane related data based on the validation. The map data may be used to generate the map which is rendered on a user interface device, for example, of the vehicle.

According to some embodiments, each of the modules 301a-301d may be embodied in the processor 301. The processor 301 may retrieve computer program code instructions that may be stored in the memory 303 for execution of computer program code instructions, which may be configured for generating storage lane markings.

The processor 301 may be embodied in a number of different ways. For example, the processor 301 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 301 may include one or more processing cores configured to perform independently. A multi-core processor may enable multiprocessing within a single physical package. Additionally, or alternatively, the processor 301 may include one or more processors configured in tandem via the bus to enable independent execution of instructions, pipelining and/or multithreading.

Additionally, or alternatively, the processor 301 may include one or more processors capable of processing large volumes of workloads and operations to provide support for big data analysis. In an example embodiment, the processor 301 may be in communication with the memory 303 via a bus for passing information to mapping platform 105. The memory 303 may be non-transitory and may include, for example, one or more volatile and/or non-volatile memories. In other words, for example, the memory 303 may be an electronic storage device (for example, a computer readable storage medium) comprising gates configured to store data (for example, bits) that may be retrievable by a machine (for example, a computing device like the processor 301). The memory 303 may be configured to store information, data, content, applications, instructions, or the like, for enabling the system 101 to carry out various functions in accordance with an example embodiment of the present invention. For example, the memory 303 may be configured to buffer input data for processing by the processor 301. As exemplarily illustrated in FIG. 3, the memory 303 may be configured to store instructions for execution by the processor 301. As such, whether configured by hardware or software methods, or by a combination thereof, the processor 301 may represent an entity (for example, physically embodied in circuitry) capable of performing operations according to an embodiment of the present invention while configured accordingly. Thus, for example, when the processor 301 is embodied as an ASIC, FPGA or the like, the processor 301 may be specifically configured hardware for conducting the operations described herein. Alternatively, as another example, when the processor 301 is embodied as an executor of software instructions, the instructions may specifically configure the processor 301 to perform the algorithms and/or operations described herein when the instructions are executed. However, in some cases, the processor 301 may be a processor specific device (for example, a mobile terminal or a fixed computing device) configured to employ an embodiment of the present invention by further configuration of the processor 301 by instructions for performing the algorithms and/or operations described herein. The processor 301 may include, among other things, a clock, an arithmetic logic unit (ALU) and logic gates configured to support operation of the processor 301.

In some embodiments, the processor 301 may be configured to provide Internet-of-Things (IoT) related capabilities to users of the system 101, where the users may be a traveler, a driver of the vehicle and the like. In some embodiments, the users may be or correspond to an autonomous or semi-autonomous vehicle. The IoT related capabilities may in turn be used to provide smart navigation solutions by providing real time updates to the users to take pro-active decision on wrong way driving determination, speed determination, lane-level speed determination, turn-maneuvers, lane changes, overtaking, merging and the like, big data analysis, autonomous vehicle maneuvering and control and sensor-based data collection by using the cloud based mapping system for providing navigation recommendation services to the users. The system 101 may be accessed using the communication interface 305. The communication interface 305 may provide an interface for accessing various features and data stored in the system 101. For example, the communication interface 305 may comprise I/O interface which may be in the form of a GUI, a touch interface, a voice enabled interface, a keypad, and the like. For example, the communication interface 305 may be a touch enabled interface of a navigation device installed in a vehicle, which may also display various navigation related data to the user of the vehicle. Such navigation related data may include information about upcoming conditions on a route, route display, alerts about vehicle speed, user assistance while wrong way driving, and the like.

FIG. 8 is a flowchart of a method 800 of generating a storage lane marking, in accordance with one or more example embodiments described above. The method 800 is already discussed in conjunction with FIGS. 4-7. Appropriate references may be used interchangeably wherever required, without deviating from the scope of the present disclosure.

The method 800 comprises, at step 801, generating a candidate storage lane marking for a first topology. For example, the candidate storage lane marking for the first topology is generated based on the candidate storage lane marking being (i) to the left of a leftmost through-traffic lane marking of the first topology, or (ii) to the right of a rightmost through-traffic lane marking of the first topology. In another example, the candidate storage lane marking for the first topology is generated based on either start or end of the first topology. In an embodiment, generating the candidate storage lane marking is further based on a lane width associated with the first topology. In an embodiment, generating the candidate storage lane marking is further based on a lane width associated with the first topology. It should be further noted that the candidate storage lane marking is associated with a storage lane, wherein the storage lane stores at least one of a left turning traffic or a right turning traffic associated with the first topology, when the at least one of the left turning traffic or the right turning traffic is in a waiting state.

The method 800 comprises, at step 803, making a determination of whether the candidate storage lane marking is valid or not. For example, the determination of whether the candidate storage lane marking is valid may be made based on whether one or more vehicle path locations are located within a polygon defined by (a) the candidate storage lane marking and (b) a corresponding edge of the first topology. It should be noted that the corresponding edge of the first topology may be the leftmost through-traffic lane marking if the candidate storage lane marking is generated to the left of the leftmost through-traffic lane marking. Further, the corresponding edge of the first topology may be the rightmost through-traffic lane marking if the candidate storage lane marking is generated to the right of the rightmost through-traffic lane marking. In another example, the determination of whether the candidate storage lane marking is valid may be made based on whether the candidate storage lane marking is located within another topology different from the first topology. It should be noted that the left most through-traffic lane marking is associated with a left most lane of the first topology on which straight running traffic navigates. The right most through-traffic lane marking is associated with a right most lane of the first topology on which the straight running traffic navigates.

A candidate storage lane marking may be invalid when the additional lane marking includes the candidate storage lane marking within a third threshold distance associated with the nearby topology. The third threshold distance may be predetermined. In an embodiment, the method 800 may further include an additional step of updating the map data with storage lane related data based on the validation.

The method 800 further comprises, at step 805, performing a check to determine if the candidate storage lane marking is valid. If at step 805, it is determined that the candidate storage lane marking is not valid then, responsive to the determination, the method 800 proceeds to step 807 ("No" path). At step 807, the candidate storage lane marking is discarded or disregarded. However, if at step 805, it is determined that the candidate storage lane marking is valid then, responsive to the determination, the method 800 proceeds to step 809 ("Yes" path). At step 809, the candidate storage lane marking is outputted. For example, the candidate storage lane marking is valid if one or more vehicle path locations are located within the polygon. Further, the candidate storage lane marking is valid if the candidate storage lane marking is not located within another topology.

Additionally, the method 800 may further include a step of estimating a geometry of a storage lane. The geometry of the storage lane may be estimated based on a trajectory formed by the one or more vehicle path locations and a subset of the lane marking data associated with the first topology, such that the subset of the lane marking data comprises lane marking detections within a first threshold distance of the trajectory.

It will be understood that each block of the flow diagram of the method 800 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 303 of the system 101, employing an embodiment of the present invention and executed by the processor 301. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 800 support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Further using any of the methods described in the accompanying embodiments of the flowchart shown in FIG. 8, which implements the various functionalities of the system 101 described in FIG. 3, the accurate generating of storage lane marking may be enabled. This is specifically advantageous in cases of map data related to storage lane markings, which may otherwise go missing for the lack of storage lane detection capabilities due to any of the reasons discussed previously. This is particularly useful for high definition maps which are used for autonomous driving vehicles, as the system 101 improves the quality of map data stored in map database 105*a*, thereby leading to more accurate, safe and reliable decision making for autonomous driving scenarios.

Additionally, the vehicle may include a motor vehicle, a non-motor vehicle, an automobile, a car, a scooter, a truck, a van, a bus, a motorcycle, a bicycle, a Segway, and/or the like. The vehicle may be a semiautonomous vehicle, or even a manual vehicle. In various embodiments, the vehicle may be equipped with various sensors for generating or collecting sensor data. For instance, the sensors of the vehicle may include a radar system, a LiDAR system, a global positioning sensor for gathering location data (e.g., GPS coordinates), temporal information sensors, orientation sensors augmented with height sensors, tilt sensors, image sensors, and the like. In some example embodiments, the sensor data may be generated and reported to the system 101, at a predefined frequency. For instance, the predefined frequency may be as high as one hertz, based on the capabilities of the sensors. In any which way, the vehicle may be able to gain advantage of the system 101 and method 800, irrespective of the type of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system comprising:
    a memory configured to store computer-executable instructions; and
    at least one processor configured to execute the computer-executable instructions to:
        generate a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology;
        make a determination that the candidate storage lane marking is valid based on one or more of following: (i) whether one or more vehicle path locations are located within a polygon defined by (a) the candidate storage lane marking and (b) a corresponding edge of the first topology, or (ii) whether the candidate storage lane marking is located within another topology different from the first topology or within a first threshold distance from another topology, wherein the corresponding edge of the first topology is the leftmost through-traffic lane marking if the candidate storage lane marking is generated to the left of the leftmost through-traffic lane marking, or the rightmost through-traffic lane marking if the candidate storage lane marking is generated to the right of the rightmost through-traffic lane marking;
        estimate a geometry of the validated storage lane marking based on (i) a trajectory formed by one or more vehicle path locations, and (ii) a subset of lane marking detections associated with the first topology, wherein the subset of lane marking detections comprises lane markings within a second threshold distance of the trajectory; and
        update a map database to represent a storage lane for navigating vehicles either towards or away from the first topology as a function of the validated and geometry-estimated storage lane marking.

2. The system of claim 1, wherein generating the candidate storage lane marking is further based on a lane width associated with the first topology.

3. The system of claim 1, wherein making the determination comprises:
    determining that the candidate storage lane marking is valid if one or more vehicle path locations are located within the polygon.

4. The system of claim 1, wherein making the determination further comprises:
    determining that the candidate storage lane marking is valid if the candidate storage lane marking is not located within another topology.

5. The system of claim 1, wherein the candidate storage lane marking is associated with a storage lane, such that the storage lane stores at least one of a left turning traffic or a right turning traffic associated with the first topology, when the at least one of the left turning traffic or the right turning traffic is in a waiting state.

6. The system of claim 1, wherein the at least one processor is further configured to:
    estimate a geometry of a storage lane based on a trajectory formed by the one or more vehicle path locations and a subset of the lane marking data associated with the first topology, such that the subset of the lane marking data comprises lane marking detections within a first threshold distance of the trajectory.

7. A method comprising:
    generating a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology;
    making a determination that the candidate storage lane marking is valid based on one or more of following: (i) whether one or more vehicle path locations are located within a polygon defined by (a) the candidate storage lane marking and (b) a corresponding edge of the first topology, or (ii) whether the candidate storage lane marking is located within another topology different from the first topology or within a first threshold distance from another topology, wherein the corresponding edge of the first topology is the leftmost through-traffic lane marking if the candidate storage lane marking is generated to the left of the leftmost through-traffic lane marking, or the rightmost through-traffic lane marking if the candidate storage lane marking is generated to the right of the rightmost through-traffic lane marking; and
    estimating a geometry of the validated storage lane marking based on (i) a trajectory formed by one or more vehicle path locations, and (ii) a subset of lane marking detections associated with the first topology, wherein the subset of lane marking detections comprises lane markings within a second threshold distance of the trajectory; and updating a map database to represent a storage lane for navigating vehicles either towards or away from the first topology as a function of the validated and geometry-estimated storage lane marking.

8. The method of claim 7, wherein generating the candidate storage lane marking is further based on a lane width associated with the first topology.

9. The method of claim 7, wherein making the determination comprises at least one of:
determining that the candidate storage lane marking is valid if one or more vehicle path locations are located within the polygon; and
determining that the candidate storage lane marking is valid if the candidate storage lane marking is not located within another topology.

10. The method of claim 7, wherein the candidate storage lane marking is associated with a storage lane, such that the storage lane stores at least one of a left turning traffic or a right turning traffic associated with the first topology, when the at least one of the left turning traffic or the right turning traffic is in a waiting state.

11. The method of claim 7, further comprising:
estimating a geometry of a storage lane based on a trajectory formed by the one or more vehicle path locations and a subset of the lane marking data associated with the first topology, such that the subset of the lane marking data comprises lane marking detections within a first threshold distance of the trajectory.

12. A computer program product comprising a non-transitory computer readable medium having stored thereon computer executable instructions which when executed by at least one processor, cause the processor to carry out operations comprising:
generating a candidate storage lane marking for a first topology based on: the candidate storage lane marking being (i) to the left of a leftmost through-traffic lane marking of the first topology or to the right of a rightmost through-traffic lane marking of the first topology, and (ii) on either start or end of the first topology;

making a determination that the candidate storage lane marking is valid based on one or more of following: (i) whether one or more vehicle path locations are located within a polygon defined by (a) the candidate storage lane marking and (b) a corresponding edge of the first topology or within a first threshold distance from another topology, or (ii) whether the candidate storage lane marking is located within another topology different from the first topology, wherein the corresponding edge of the first topology is the leftmost through-traffic lane marking if the candidate storage lane marking is generated to the left of the leftmost through-traffic lane marking, or the rightmost through-traffic lane marking if the candidate storage lane marking is generated to the right of the rightmost through-traffic lane marking;

estimating a geometry of the validated storage lane marking based on (i) a trajectory formed by one or more vehicle path locations, and (ii) a subset of lane marking detections associated with the first topology, wherein the subset of lane marking detections comprises lane markings within a second threshold distance of the trajectory; and updating a map database to represent a storage lane for navigating vehicles either towards or away from the first topology as a function of the validated and geometry-estimated storage lane marking.

13. The computer program product of claim 12, wherein making the determination comprises at least one of:
determining that the candidate storage lane marking is valid if one or more vehicle path locations are located within the polygon; or
determining that the candidate storage lane marking is valid if the candidate storage lane marking is not located within another topology.

14. The computer program product of claim 12, wherein the operations further comprise:
estimating a geometry of a storage lane based on a trajectory formed by the one or more vehicle path locations and a subset of the lane marking data associated with the first topology, such that the subset of the lane marking data comprises lane marking detections within a first threshold distance of the trajectory.

* * * * *